United States Patent [19]
Suh

[11] Patent Number: 5,862,143
[45] Date of Patent: Jan. 19, 1999

[54] BYTE ALIGNER AND FRAME SYNCHRONIZER FOR 622 MBIT/S HIGH-SPEED DATA

[75] Inventor: Chung-Wook Suh, Yusong-ku, Rep. of Korea

[73] Assignee: Electronics and Telecommunications Research Institute, Daejeon, Rep. of Korea

[21] Appl. No.: 716,648

[22] Filed: Sep. 16, 1996

[30] Foreign Application Priority Data

Dec. 6, 1995 [KR] Rep. of Korea ................. 1995 47051

[51] Int. Cl.⁶ ..................................................... H04L 7/08
[52] U.S. Cl. ........................... 370/513; 370/512; 370/513; 370/514; 375/365; 375/366; 375/368
[58] Field of Search ..................... 370/512, 513, 370/514; 375/365, 368, 366

[56] References Cited

U.S. PATENT DOCUMENTS 4,748,623  5/1988  Fujimoto ................................ 370/514

5,710,774  1/1998  Suh et al. ................................ 370/513

OTHER PUBLICATIONS

IEEE Communications Magazine, Feb. 1990 .Choi, DooWhan;'Frame Alignment in a Digital Carrier System–A Tutorial'pp. 47–54.

"ICC 75" Xiaokang, Lin et al 'A New Desing of the STM–1 Frame Aligner'pp. 1–4.

*Primary Examiner*—Chi H. Pham
*Assistant Examiner*—Frank Duong
*Attorney, Agent, or Firm*—Nixon & Vanderhye P.C.

[57] ABSTRACT

A byte aligner and frame synchronizer for 622 Mbit/s high speed data includes a clock divider, a data width extension circuit, a byte alignment controller, a byte alignment circuit, a pattern selector, a continuous pattern detector, a frame pulse generator, a frame sync detector, a frame sync loss detector, and frame sync error detector, and performs byte alignment very fast while also stabilizing frame synchronization by reinforcing an error correction function.

13 Claims, 15 Drawing Sheets

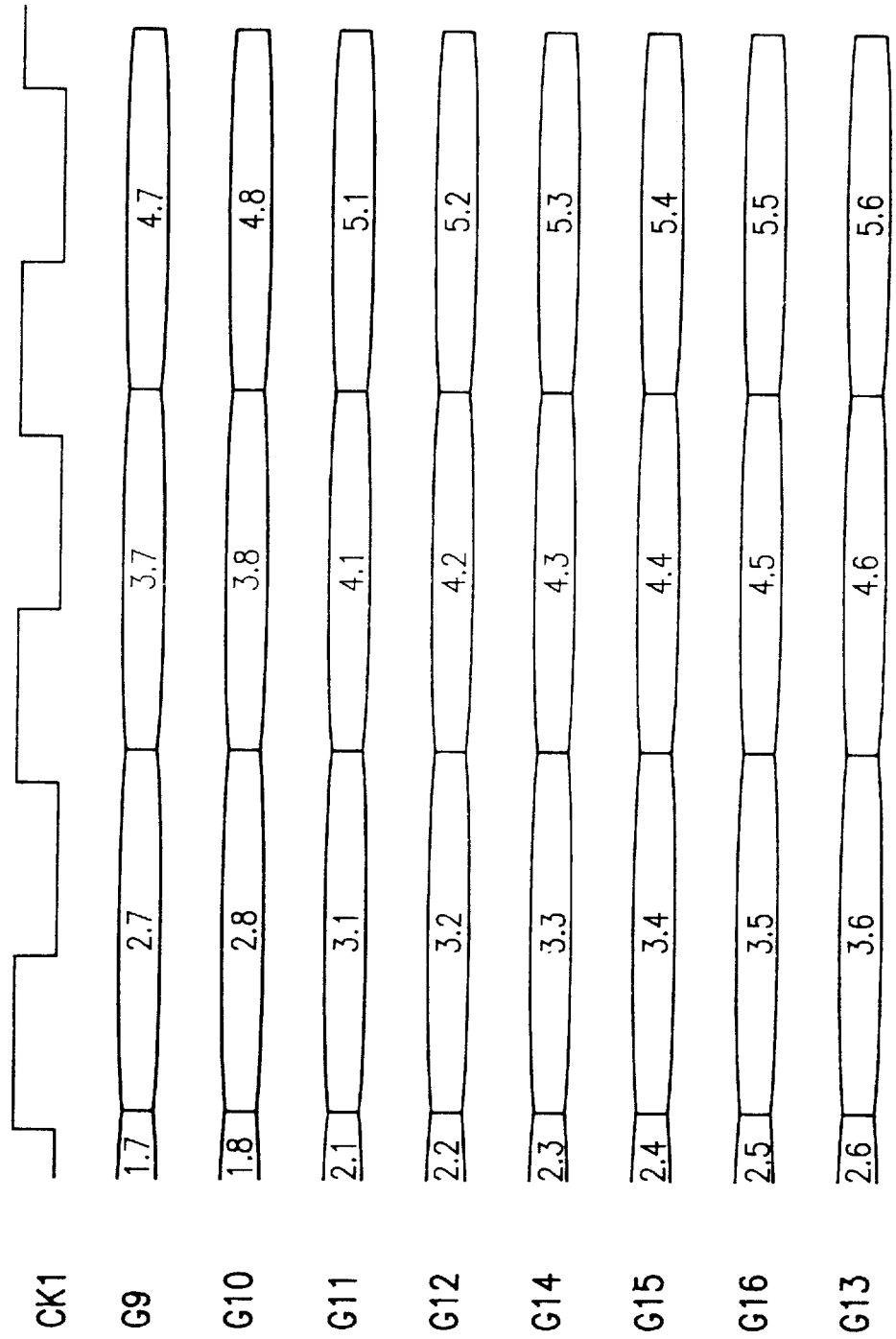

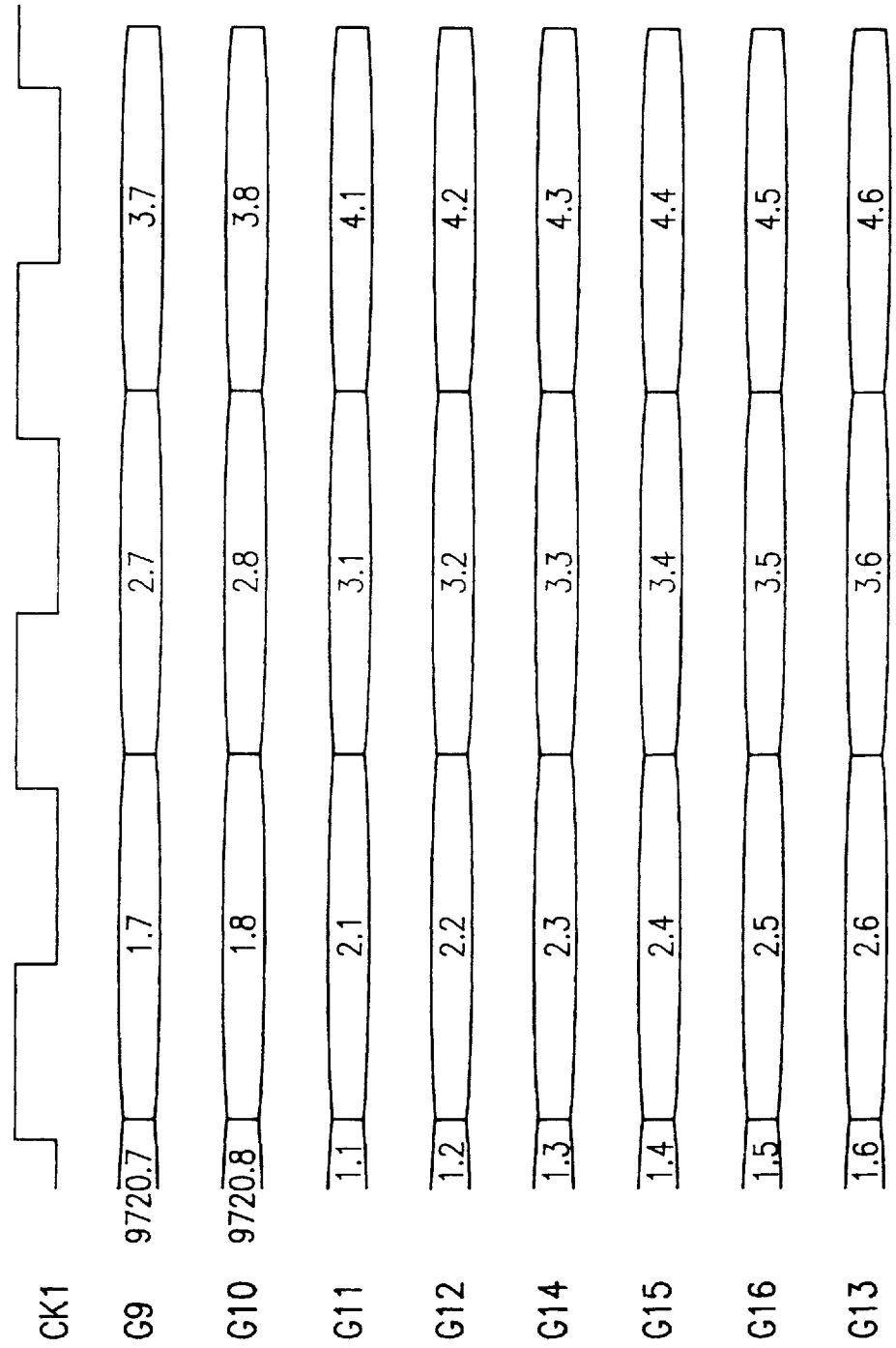

BYTE ALIGNER AND FRAME SYNCHRONIZER FOR 622 MBIT/S HIGH-SPEED DATA

BACKGROUND OF THE INVENTION

1. Field of the Invention

The present invention relates to the field of communications, and more particularly, to a byte aligner and frame synchronizer for data transmission of 622 Mbit/s used in high-speed data communication systems.

2. Description of Related Art

Today, high speed data communication requires a byte aligner and frame synchronizer which can accomodate high speed data such as data of 622 Mbit/s rate or higher.

The conventional frame synchronizers are commonly used for data of 155 Mbit/s rate or lower. But, applied to high speed data communication, such a frame synchronizer needs a long synchronization time, more hardware and high-priced manufacture because of its structural problems. Explaining in more detail, since it has to perform frame synchronization using all of the frame bytes, the conventional frame synchronizer has to wait for all of the frame bytes and this needs a considerably long time to effect frame synchronization. In addition, since it processes data serially, for accommodating 622 Mbit/s data, such a frame synchronizer needs more hardware and high-priced manufacture.

Therefore, seen in view of performance and economy, the conventional frame synchronizer is not appropriate for application to 622 Mbit/s data.

In general, in high speed data communication such as time-division multiplex of synchronous transport module-4 concatenation (STM-4C), data is transmitted by a frame unit with a period of 125 $\mu$sec which data is not only allocated sequentially to the corresponding time slots but twenty-four frame bytes are also inserted in the data stream every 125 $\mu$sec. Then, at the receiver, frame synchronization is acquired by extracting the frame signal from received data according to a pre-defined rule.

According to the ITU-T standard, the frame format for STM-4C is as follows: twelve A1 bytes stream whose binary bits are 11110110 and continuously twelve A2 bytes stream whose binary bits are 00101000. In addition, such frame bytes are defined to place in the front position of STM-4C data stream.

Fujimoto's U.S. Pat. No. 4,748,623 disclosed only frame synchronization and serial-to-parallel conversion without byte alignment. According to this disclosure, this device confirms whether the frame sync pattern is present or not in the received data, and then once present, it extracts a frame pulse from the received data and makes a timing control signal for a frame pulse. Such a timing control signal adjusts the liming of received data to acquire a frame synchronization correctly.

However, since it requires such complex processes and is invented for 155 Mbit/s, for applying to the frame synchronization for 622 Mbit/s data, this disclosure has disadvantages that it increases the clock frequency and the amount of hardware. In addition, it needs more precise byte alignment hardware to prevent byte alignment error during serial-parallel conversion.

Another conventional art, which is disclosed in U.S. Pat. No. 4,748,623, acquires frame synchronization using a parallel processing method. After this disclosure detects the frame synchronization pattern, it compares its timing using a timing comparator and synchronization protection circuit and then adjusts the timing of the frame synchronization by a timing controller.

But, because of not having the frame error control function, detecting the analogous pattern with the frame pattern, this disclosure operates automatically unnecessary processes such as frame synchronization and timing adjustment. Thus, because it is liable to malfunction by an analogous frame pattern, this disclosure is not appropriate for 622 Mbit/s data in which can occur more analogous frame patterns than in lower speed data.

For still another reference, there is a paper by DooWhan Choi entitled "Frame alignment in a digital carrier system" (hereinafter referred to as paper 1) in IEEE comm. magazine (Feb. 1990). Paper 1 deals with frame alignment in the digital carrier system with an added-bit frame and burst frame, and suggests simulation results of acquisition time and loss time in frame synchronization. However, paper 1 presents only ideal conditions and ideal values for improving the performance of frame synchronization, but has no specific implementation for frame synchronization.

For a further reference, there is a paper (hereinafter referred to as paper 2) by Lin Xiaokang entitled "A new design of the STM-1 frame aligner" in ECC'93. Paper 2 shows the method of frame synchronization in the STM-1 frame structure. That is, this paper describes the method of frame synchronization acquired by searching the A1A1A2 pattern among eight frame bytes using parallel processing. But, since this paper describes technologies for 155 Mbit/s data only, it is not appropriate to apply this technique to frame synchronization for 622 Mbit/s data.

SUMMARY OF THE INVENTION

The object of the present invention is to carry out byte alignment and frame synchronization under a 622 Mbit/s transmission system with several features as follows: correct and fast byte alignment, simple structure for frame synchronization, and stable frame synchronization by communication between byte alignment and frame synchronization.

In order to attain the above objects, we provide a byte aligner and frame synchronizer for 622 Mbit/s high-speed data, comprising: clock division means generating the second clock by dividing the first clock; data width extention means for extending eight input data into sixteen output data clocked by the first clock; byte alignment control means for generating a control signal from the sixteen outputs of the data width extention means so as to control the byte alignment; byte alignment means for aligning the data output from the data width extension means in byte driven by the byte control signal of the byte alignment control means; A1A1 pattern detection means for detecting two continuous A1 frame bytes from the data aligned in byte by said byte alignment means; A2A2 pattern detection means for detecting two continuous A2 frame bytes from the data aligned in byte by said byte alignment means; pattern selection means for selecting one of the output of said A1A1 pattern detection means and the output of said A2A2 pattern detection means pattern selection means for selecting one of the output signal of said A1A1 pattern detection means and the output signal of said A2A2 pattern detection means; continuous pattern detection means for detecting whether an A1 frame pattern consisted of twelve continuous A1 frame bytes or an A2 frame pattern consisted of twelve continuous A2 frame bytes is received, in response to one of the signals from said pattern selection means synchronized with said second clock CK2 from said clock division means; frame pulse generation means for detecting whether the A2 frame pattern is received in sequence to said A1 frame pattern, in response to the second clock, so as to generate a frame pulse (FRP); frame; sync detection means for detecting whether said frame pulse signal from said frame pulse generation means is received continuously twice, in response to said second clock, so as to generate a frame sync signal FRSYNC; frame loss detection means for detecting whether the frame sync signal from said frame sync detection means is not received continuously four times, in response to said second clock, so as to generate a frame sync loss detection signal OOF; and frame sync error detection means for detecting whether said frame sync loss detection signal output from said frame sync loss detection means is maintained for 3 msec, in response to said second clock.

According to an aspect of the invention, the byte aligner and synchronizer performs byte alignment very fast, and reinforces an error correction function so as to perform byte alignment which is resistant to errors producing data patterns similar to the frame pattern. Furthermore, because it can perform frame synchronization by using a relatively low-speed clock, it is easy to implement and reduces power consumption.

BRIEF DESCRIPTION OF THE DRAWINGS

The objects and features of the present invention will become clear from the following description taken in conjunction with the preferred embodiments thereof with reference to the accompanying drawings throughout which like parts are designated by like reference numerals, and in which:

FIG. 8A is a timing diagram of the received data according to an embodiment of the present invention.

FIG. 8C is a timing diagram of data E9–E16 according to an embodiment of the present invention.

DETAILED DESCRIPTION OF PREFERRED EMBODIMENT

Figure 1:
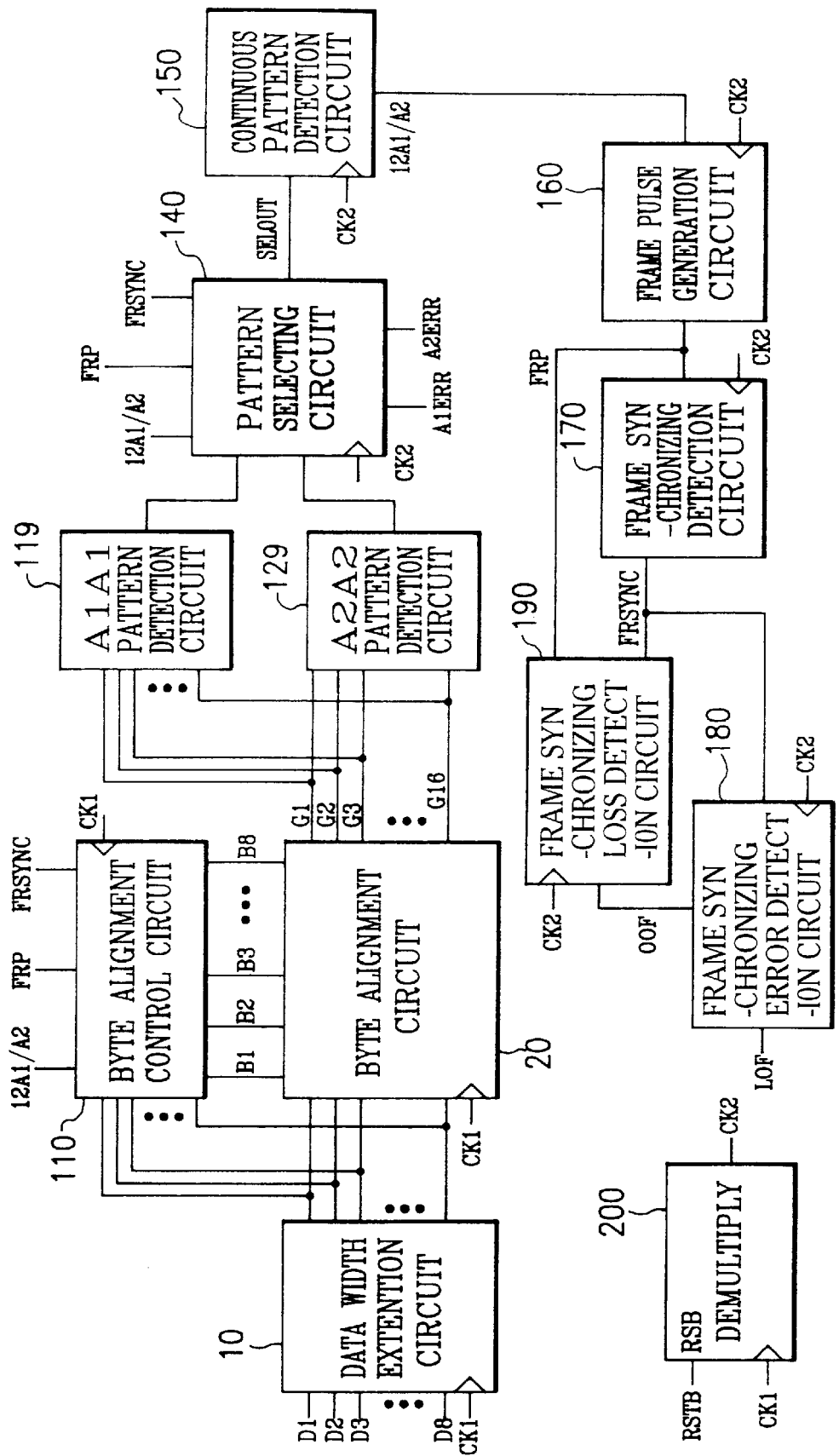
FIG. 1 is a block diagram of a byte aligner and frame synchronizer for 622 Mbit/s high speed data according to an embodiment of the present invention.

FIG. 1 is a block diagram of a byte aligner and frame synchronizer for 622 Mbit/s high speed data according to an embodiment of the present invention. The 622 Mbit/s transmitters has frame byte consisted of twelve serial A1 bytes and twelve serial A2 bytes in a frame of the period of 125 $\mu$sec.

Referring to FIG. 1, a data width extension circuit 10 converts eight parallel bits D1–D8 into sixteen parallel bits E1–E16 according to a first clock CK1. A byte alignment control circuit 110 receives sixteen parallel bits E1–E16 output from the data width extension circuit 10, generates control signals for byte alignment, and outputs the control signals to a byte alignment circuit 20 in synchronization with the first clock CK1.

The byte alignment circuit 20 aligns, in bytes, sixteen parallel bits E1–16 output from the data width extension circuit 10 according to byte alignment control signals B1–B8 output from a byte alignment control circuit 110. An A1A1 pattern detector 119 detects two serial A1 bytes from sixteen byte-aligned signals G1–G16 output from the byte alignment circuit 20. An A2A2 pattern detector 129 detects two serial A2 bytes from sixteen byte-aligned signals G1–G16 output from the byte alignment circuit 20.

Pattern selector 140 selects one of the outputs of an A1A1 pattern detector 119 and an A2A2 pattern detector 129. A serial pattern detector 150 detects whether six serial A1A1 patterns or A2A2 patterns are received from output SELOUT of the pattern selector 140. A frame pulse generator 160 detects whether or not six serial A2A2 patterns are received. A frame sync detector 170 detects whether or not the output signal FRP of the frame pulse generator 160 is received continuously twice, so as to generate a frame sync signal FRSYNC. A frame sync loss detector 190 detects whether or not the output signal FRSYNC of the frame sync detector 170 is received continuously four times, so as to generate a frame sync loss signal OOF. A frame sync error detector 180 detects whether or not the output signal OOF of frame sync loss detector 180 is maintained continuously for 3 msec, so as to generate a frame sync error signal LOF. A divider 200 divides the first clock CK1 by two, so as to generate a second clock CK2.

From now on, the respective components of the byte aligner and frame synchronizer of the present invention will he described in more detail with reference to the attached drawings.

Figure 2:
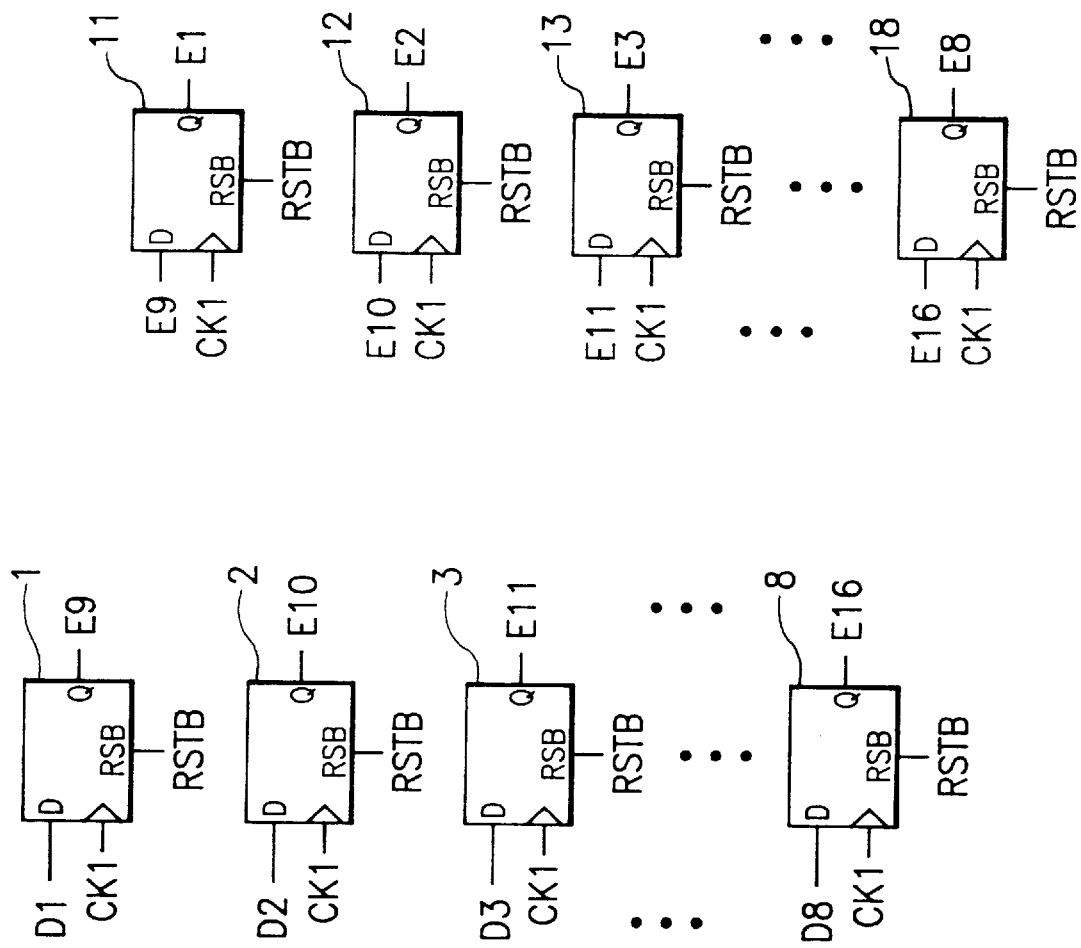
FIG. 2 is data width extension circuit diagram showing an embodiment of the present invention.

As shown in FIG. 2, the data width extension circuit 10 includes eight D-flipflops 1–8(hereinafter, referred to as 1st–8th flipflops) synchronized with the first clock CK1. The output data E9–E16 of the 1st–8th flipflops are connected to the inputs of eight D-flipflops 11–18(hereinafter, referred to as 11th–18th flipflops) in synchronization with the 1st clock CK1, and outputted as data E1–E8 via 11th–18th flipflops in synchronization with the 1st clock CK1.

Figure 3:
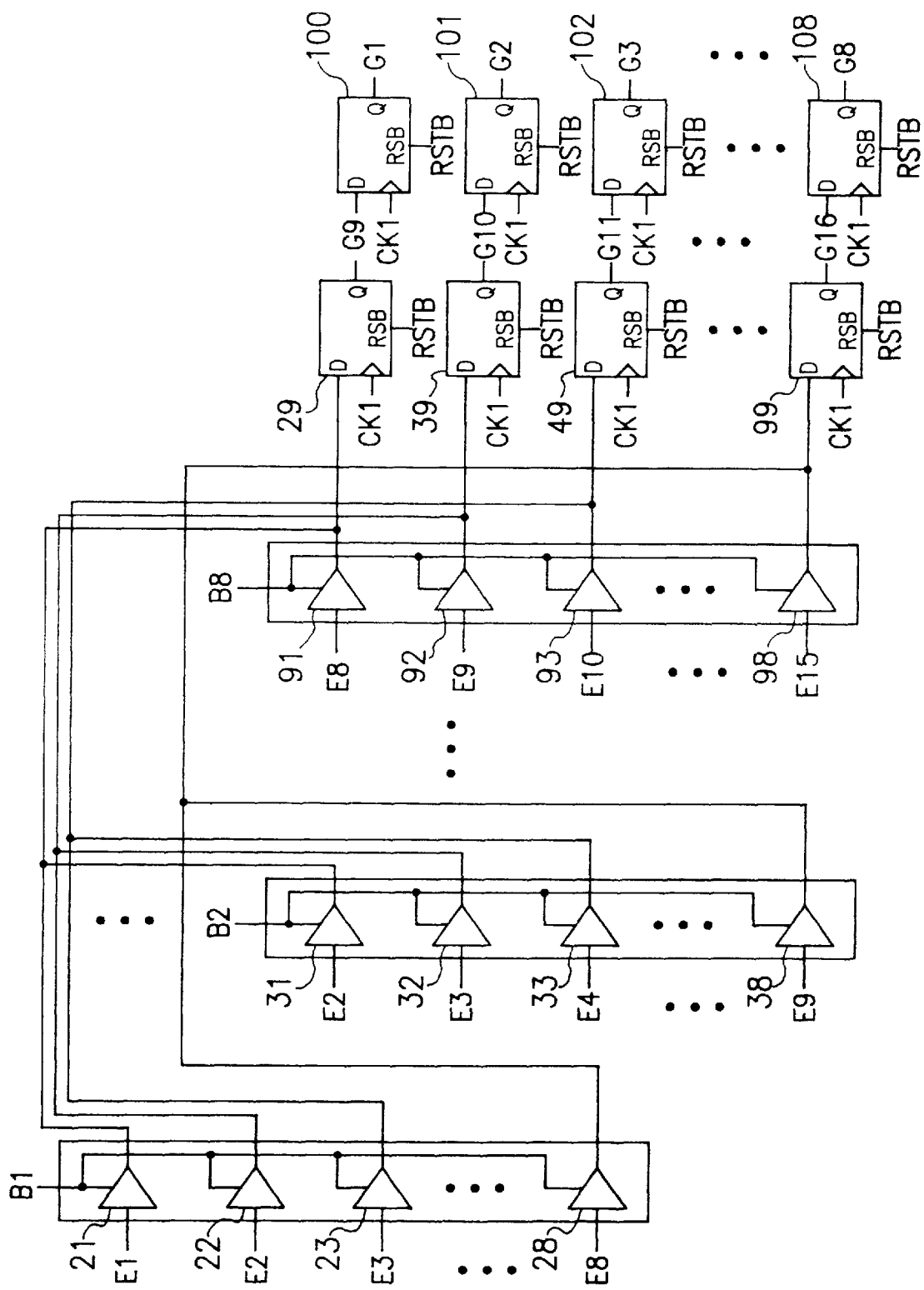
FIG. 3 is a byte alignment diagram circuit showing an embodiment of the present invention.

As shown in FIG. 3, the byte alignment circuit 20 comprises eight tri-state buffers 21–28(1st–8th tri-state buffers-;for receiving outputs E1–E8 for buffering, among the outputs E1–E16 of 1st–8th flipflops 1–8 and 11th–18th flipflops 11–18 of the data width extension circuit 10, according to the byte control signals of byte alignment control circuit 110, eight tri-state buffers 31–38(11th–18th tri-state buffers)for receiving outputs E2–E9 for buffering, eight tri-state buffers 41–28(21st–28th tri-state buffers) for receiving outputs E3–E10 for buffering, eight tri-state buffers 51–58(31st–38th tri-state buffers) for receiving outputs E4–E13 for buffering, eight tri-state buffers 61–68 (41st–48th tri-state buffers)for receiving outputs E5-E12 for buffering, eight tri-state buffers 71–78(51st–58th tri-state buffers)for receiving outputs E6–E13 for buffering, eight tri-state buffers 81–88(61st–68th tri-state buffers)for receiving outputs E7–E14 for buffering, and eight tri-state buffers 91–98(71st–78th tri-state buffers)for receiving inputs E8–E15 for buffering.

The byte alignment circuit 20 includes eight D-flipflops 29, 39, 49, 59, 69, 79, 89, 99(71st–78th flipflops) for shifting, by one bit for every first clock CK1, to output data of the first eighth tri-state 21–28, 11th–18th tri-state buffers 31–38, 21st–28th tri-state buffers 41–48, 31st–38th tri-state buffers 51–58, 41st–48th tri-state buffers 61–68, 51st–58th tri-state buffers 71–78, 61st–68th tri-state buffers 81–88, and 71st–78th tri-state buffers 91–98 so as to output eight-bit parallel data G9–G16.

The byte alignment circuit 20 further comprises eight D-flipflops 100–108(100th–108th flipflops) for receiving eight-bit parallel data G9–G16 output from the 29th–99th flipflops 29–99, and shifting them by one bit for every first clock CK1 to output eight-bit parallel data G1–G8.

Figure 4:
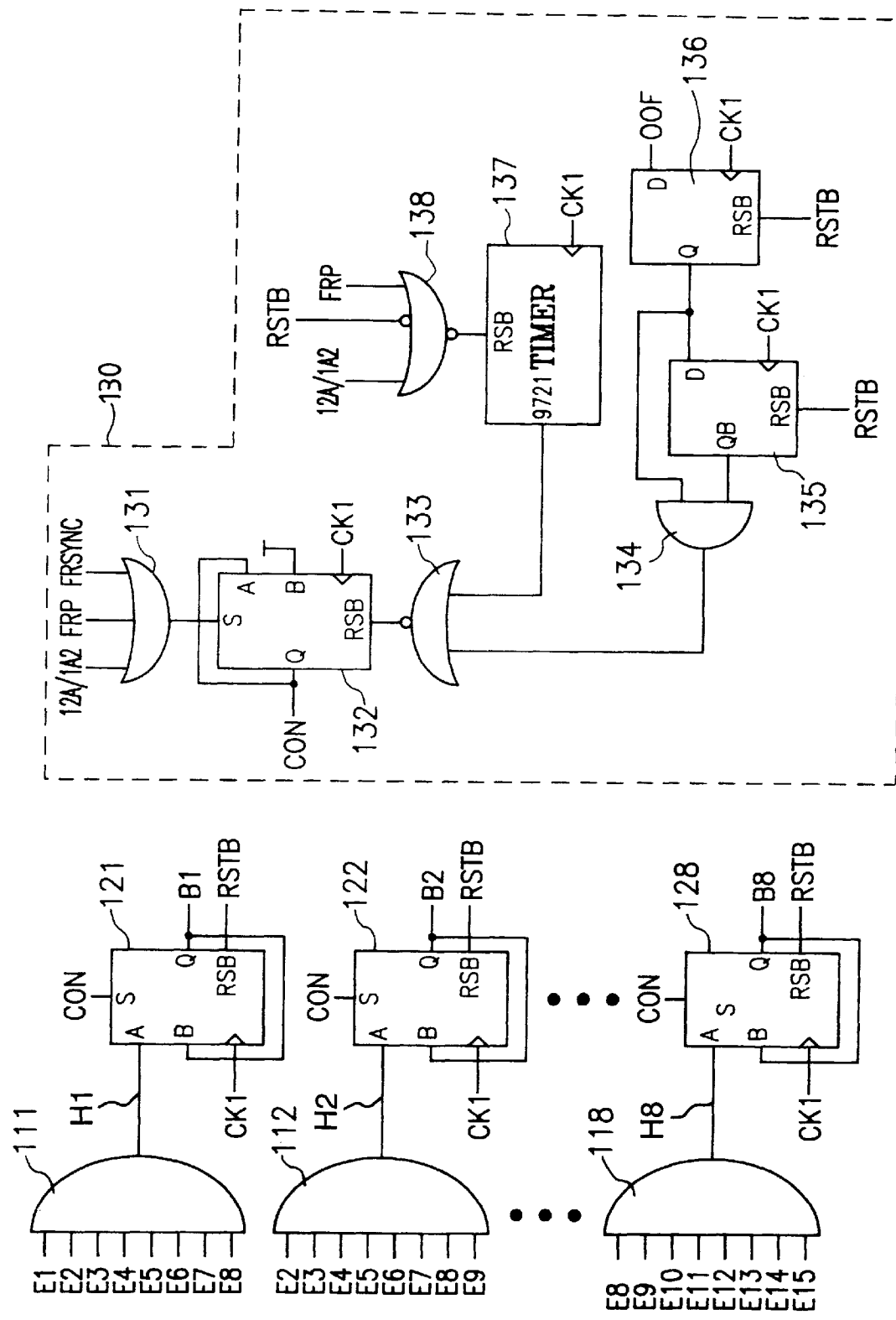
FIG. 4 is a byte alignment control circuit diagram showing an embodiment of the present invention.

Referring to FIG. 4, the byte alignment control circuit 110 comprises AND gates 111–118(111th–118th AND gate) for receiving respectively outputs E1–E8, E2–E9, E3–E10, E4–E11, E5–E12, E6–E13, E7–E14, E8–E15 among outputs E1–E16 of the data width extension circuit 10 and outputting respectively comparison signal H1–H8 indicative of whether or not they concide with A1(=11110110), multiplexed D-flipflops 121–128(121st–128th flipflop) for receiving respectively comparison signal H1–H8 and the fedback byte alignment control signal and outputting respectively byte alignment control signal B1–B8 in synchronization with the first clock CK1.

The byte alignment control circuit 110 further comprises a flip-flop control signal generator 130 which generates a control signal to maintain the 121st–128th flip-flops 121–128 to the previous values B1–B8 on the basis of frame sync loss detection signal OOF from the frame sync loss detection citcuit 190, continuous pattern detection signal 12A1/A2 from the continuous pattern detector 150, frame pulse signal FRP the from frame pulse generator 160, and frame sync signal FRSYNC from the frame sync detection circuit 170.

The flip-flop control signal generator 130 comprises a flip-flop 136(136th flipflop) for outputting frame loss detection signal OOF from the frame sync loss detector 190 according the first clock CK1, a flip-flop 135(135 flipflop) for outputting the output from the 136th flipflop 136 according to the first clock CK1, an AND gate 134(134 AND gate) for being AND the outputs of 136th flipflop 136 and 135th flipflop 135, a NOR gate 138 (138th NOR gate) for being NOR the reset signal RSTB which is input when power is applied, the frame pulse signal FRP from the frame pulse generator 160, and continuous pattern detection signal 12A1/A2 from the continuous pattern detector 150, a first timer 137 for outputting the output of the 138 NOR gate 138 at the 9721st period of the first clock CK1, a NOR gate 133(133 NOR gate) for being NOR the outputs of the 134th AND gate 134 and the first timer 137, an OR gate 131(131st OR gate) for being OR continuous pattern detection signal 12A1/A2, the frame pulse signal FRP, and the frame sync signal FRSYNC, and a D-flipflop 132 (132nd flipflop) reset by the output of the 133rd NOR gate 133 and outputting an A1 pattern detection control signal CON according to the signal output from the 131st OR gate 131.

Figure 5:
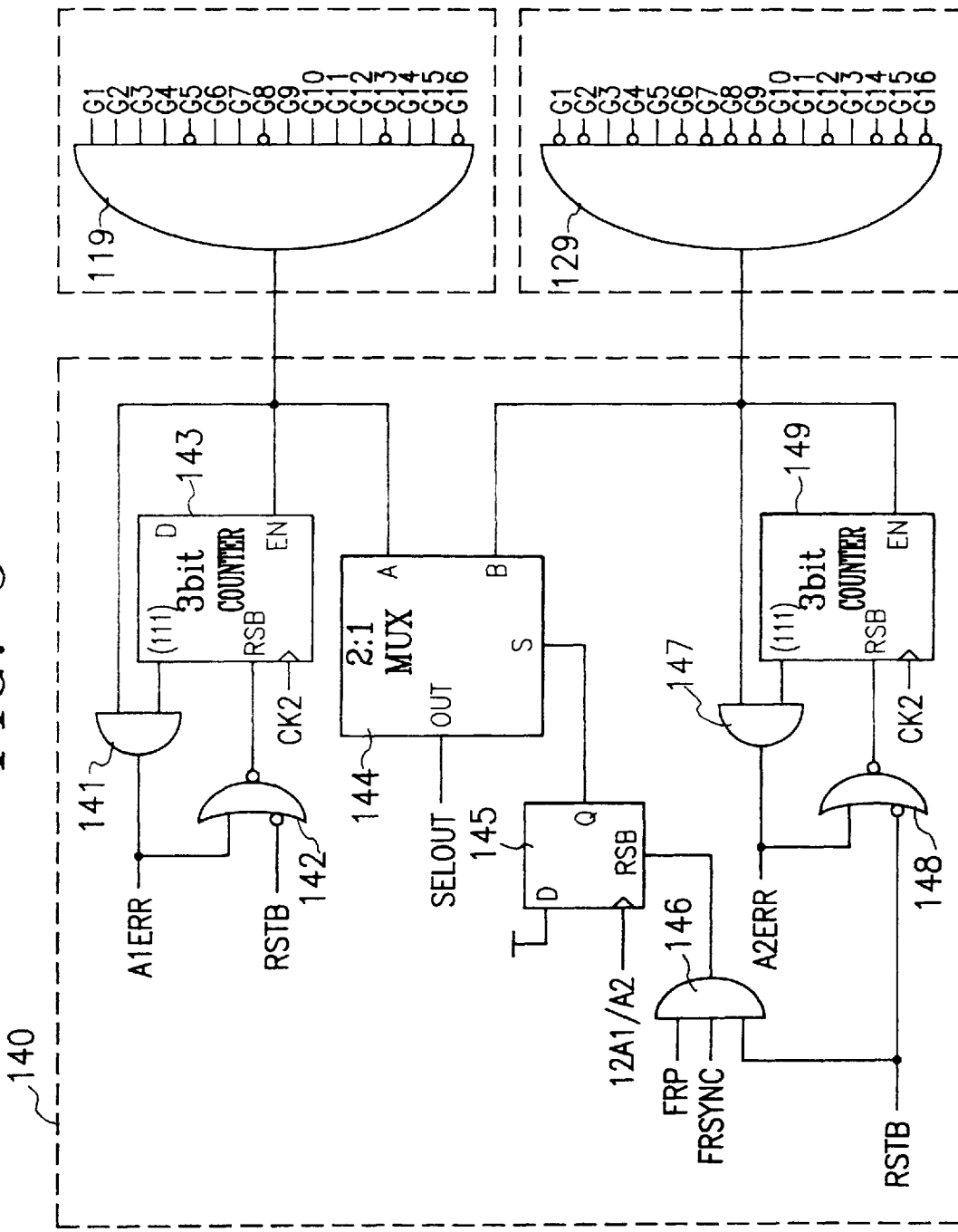
FIG. 5 is a pattern detection/selection circuit diagram showing an embodiment of the present invention.

Referring to FIG. 5, an A1A1 pattern detector 119 comprises an AND gate 119(119 AND gate) for detecting whether or not outputs of the byte alignment circuit 20 coincide with A1A1 pattern. An A2A2 pattern detector 129 comprises an AND gate 129(129 AND) for detecting whether or not outputs of the byte alignment circuit 20 coincide with A2A2 pattern.

A pattern selector 140 comprises a multiplexer 144 (144th multiplexer), a D-flipflop 145(145 flipflop), and an AND gate 146(146th AND gate), so as to select one of the outputs of A1A1 pattern detector 119 and A2A2 pattern detector 129. For detecting an error that the A1A1 pattern is continuously generated seven times, the pattern selector has an counter 143(143rd counter), an AND gate 141(141st AND gate), and a NOR gate 142 (142nd NOR gate), and for detecting an error that the A2A2 pattern is continuously generated seven times, the pattern selector has an AND gate 147(147 AND gate), and a NOR gate 148(148th NOR gate).

Figure 6:
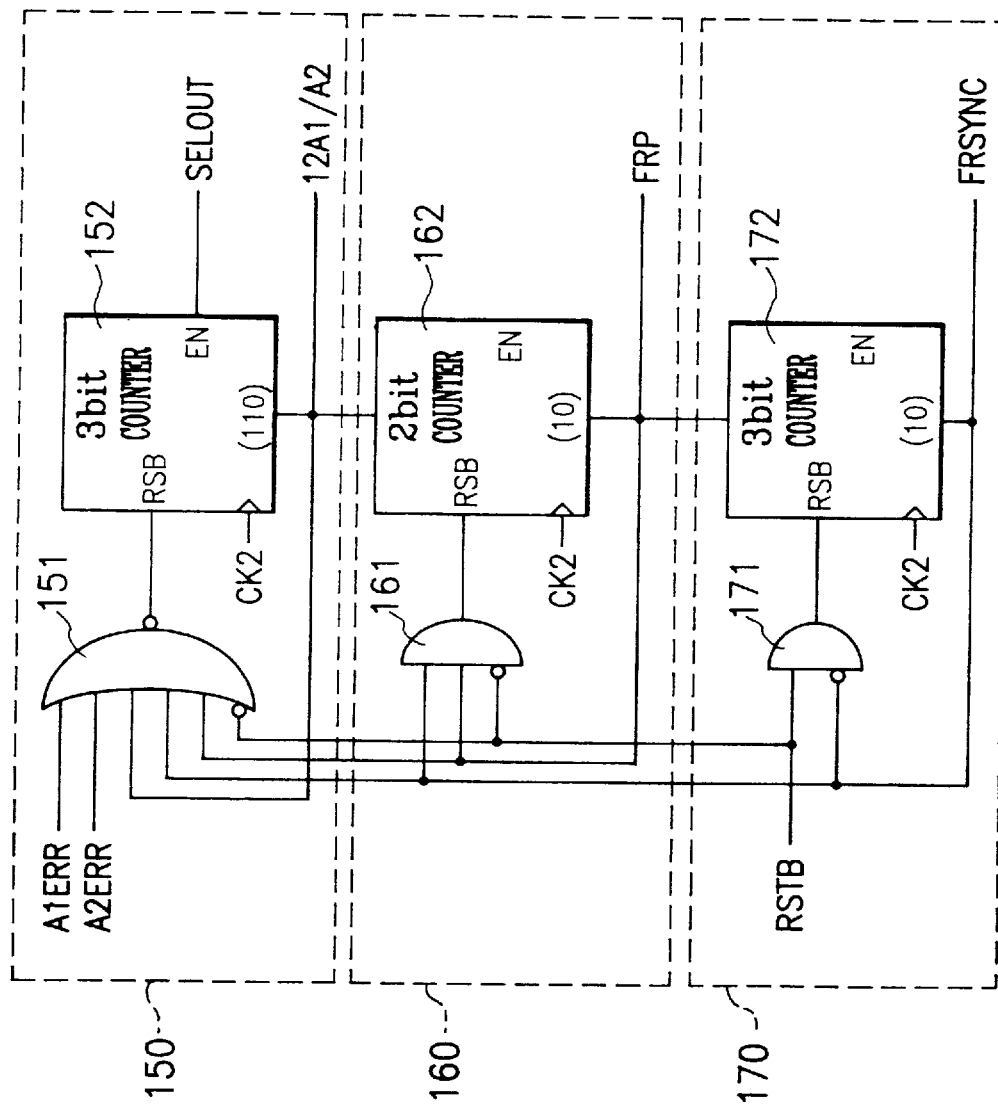
FIG. 6 is a circuit diagram including continuous pattern detector, frame pulse generator, and frame sync detector showing an embodiment of the present invention.

Referring to FIG. 6, a continuous pattern detector 150 comprises a counter 152 (152nd counter)a NOR gate 151 (151st NOR gate) for detecting whether or not the A1A1 pattern is continuously detected six times and whether or not the A2A2 pattern is continuously detected six times. A frame pulse generator 160 comprises a counter 162(162 counter) and an AND gate 161 (161st AND gate) for detecting whether or not the A1A1 pattern is continuously detected six times and then the A2A2 pattern is continuously detected six times.

A frame sync detector 170 comprises a counter 172 (172nd counter) and AND gate 171(171st AND gate) for detecting whether or not the frame pulse is continuously detected twice.

Figure 7:
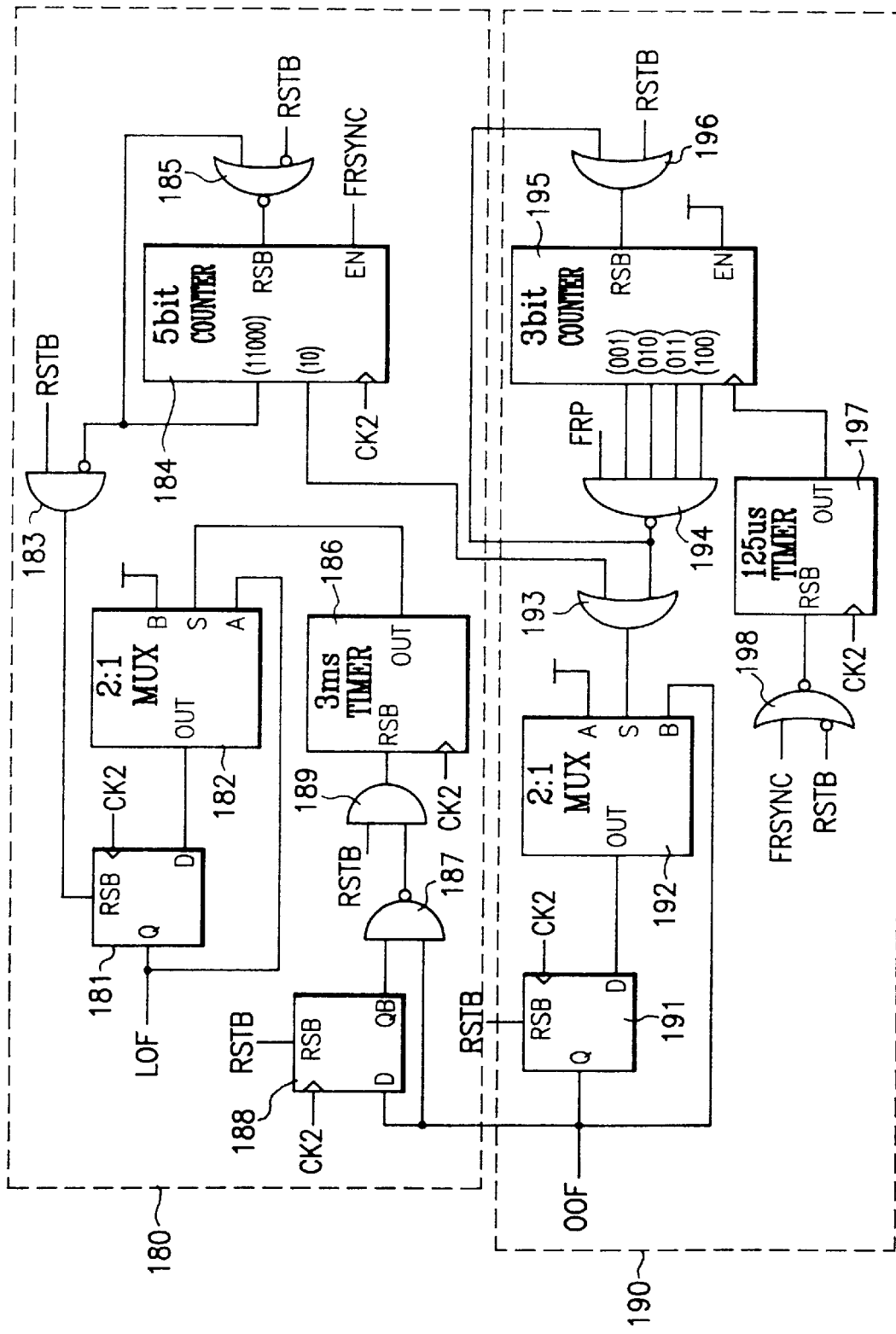
FIG. 7 is a frame sync loss detector and frame sync error detector circuit diagram showing an embodiment of the present invention.

Referring to FIG. 7 a frame sync loss detector 190 comprises a counter 195 (195th counter), a NAND gate 194(194th NAND gate), a timer 197 (197th timer), two OR gates 193 and 196 (193rd and 196th OR gates), a NOR gate 198 (198th NOR gate), a multiplexer 192 (192nd multiplexer), and a D-flipflop 191(191st flipflop), for detecting whether or not the output signal FRSYNC of the frame sync detector 170 is not generated continuously 4 times.

In order to detect whether or not the output signal OOF of a frame sync loss detector 190 is maintained for 3 msec, a frame sync error detector 180 comprises a counter 184 (184th counter), a NAND gate 187 (187th NAND gate), a NOR gate 185 (185th NOR gate), an AND gate 189 (189th AND gate), a timer 186 (186th timer), a multiplexer 182 (182nd multiplexer), and two D-flipflops 181 and 188 (181st and 188th flipflops).

Referring to FIG. 2, when power is applied, a reset signal RSTB of logic 0 is input to reset terminals RSBs of 1st–8th 1–8 and 11st–18th 11–18 flipflops, whereby they all store logic 0. A Reset signal RSTB becomes logic 1 with the lapse of time.

Figure 8B:
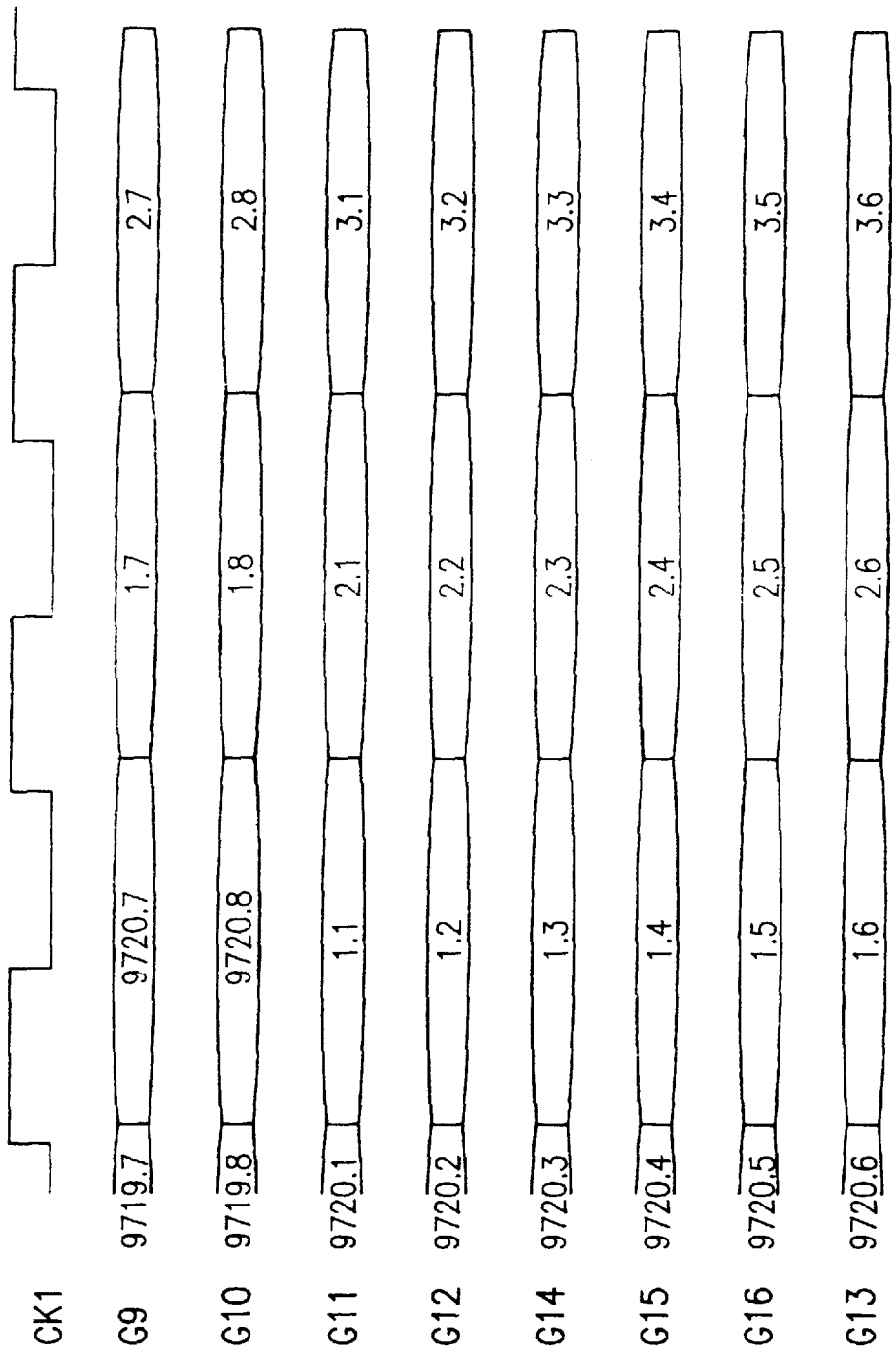
FIG. 8B is a timing diagram of data E1–E8 according to an embodiment of the present invention.

Referring to FIGS. 8A, 8B, and 8C for more clear understanding of this embodiment, parallel data D1–D8 synchronized in units of bits are shifted by one bit for every first clock CK1 according to first-eight flipflops 1–8 operating in response to the input of the first clock CK1, so as to be converted into eight bit parallel data E9–E16. Eight bit parallell data E9–E16 shifted by one bit according to the first clock CK1 are shifted by one bit for every first clock CK1 according to 11th–18th flipflops 11–18 operating in response to the input of the first clock CK1, so as to be converted into eight-bit parallel data E1–E8.

Referring to FIG. 3, when power is applied, the reset signal RSTB of logic 0 is input to every reset terminals RSBs of flipflops 29, 39, 49, 59, 69, 79, 89, 100, 101, 102, 103, 104, 105, 106, 107, 108, whereby they all store logic 0. The reset sinal RSTB becomes logic 1 with the lapse of time.

Figure 8D:
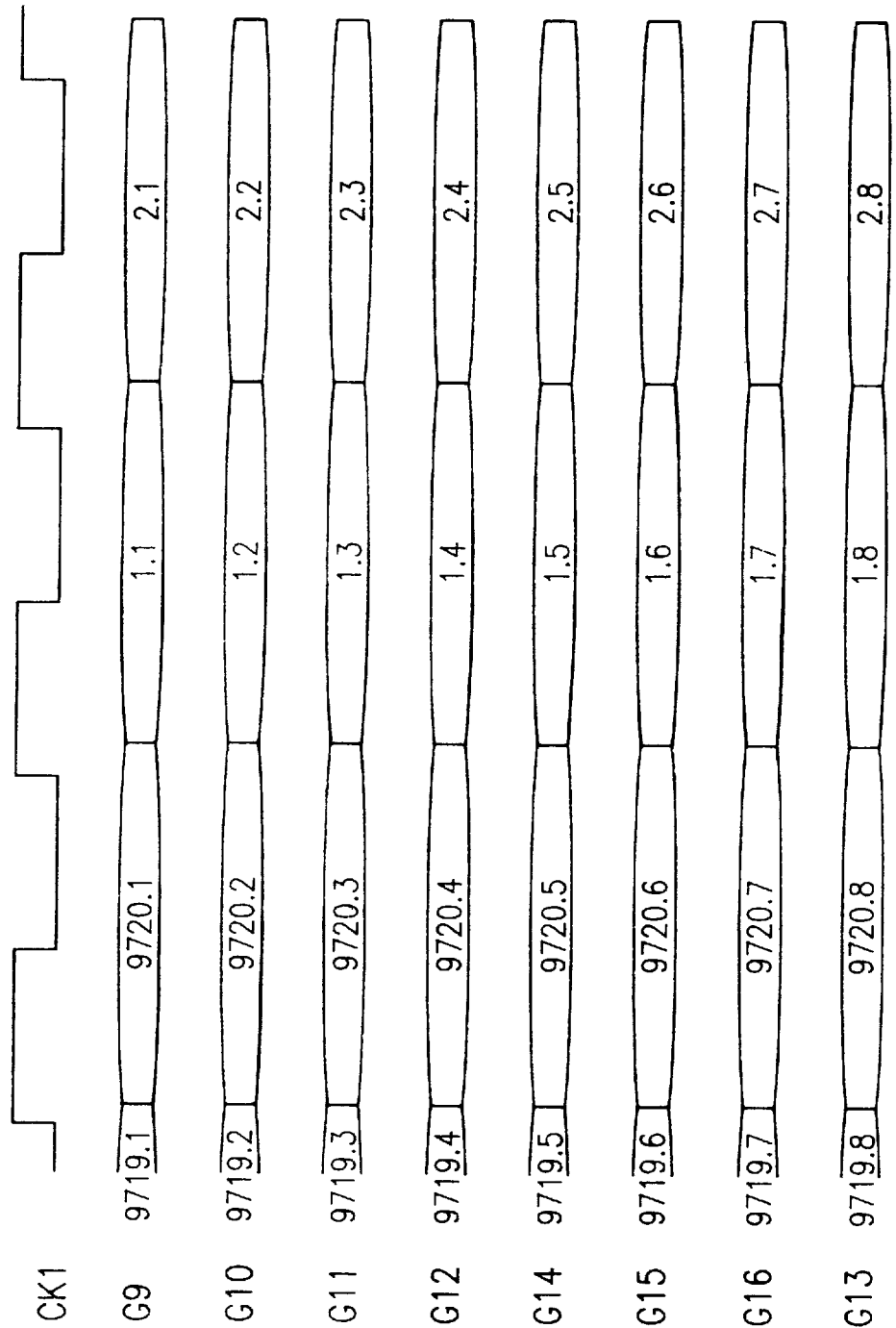
FIG. 8D is a timing diagram of data G1–G8 according to an embodiment of the present invention.
Figure 8E:
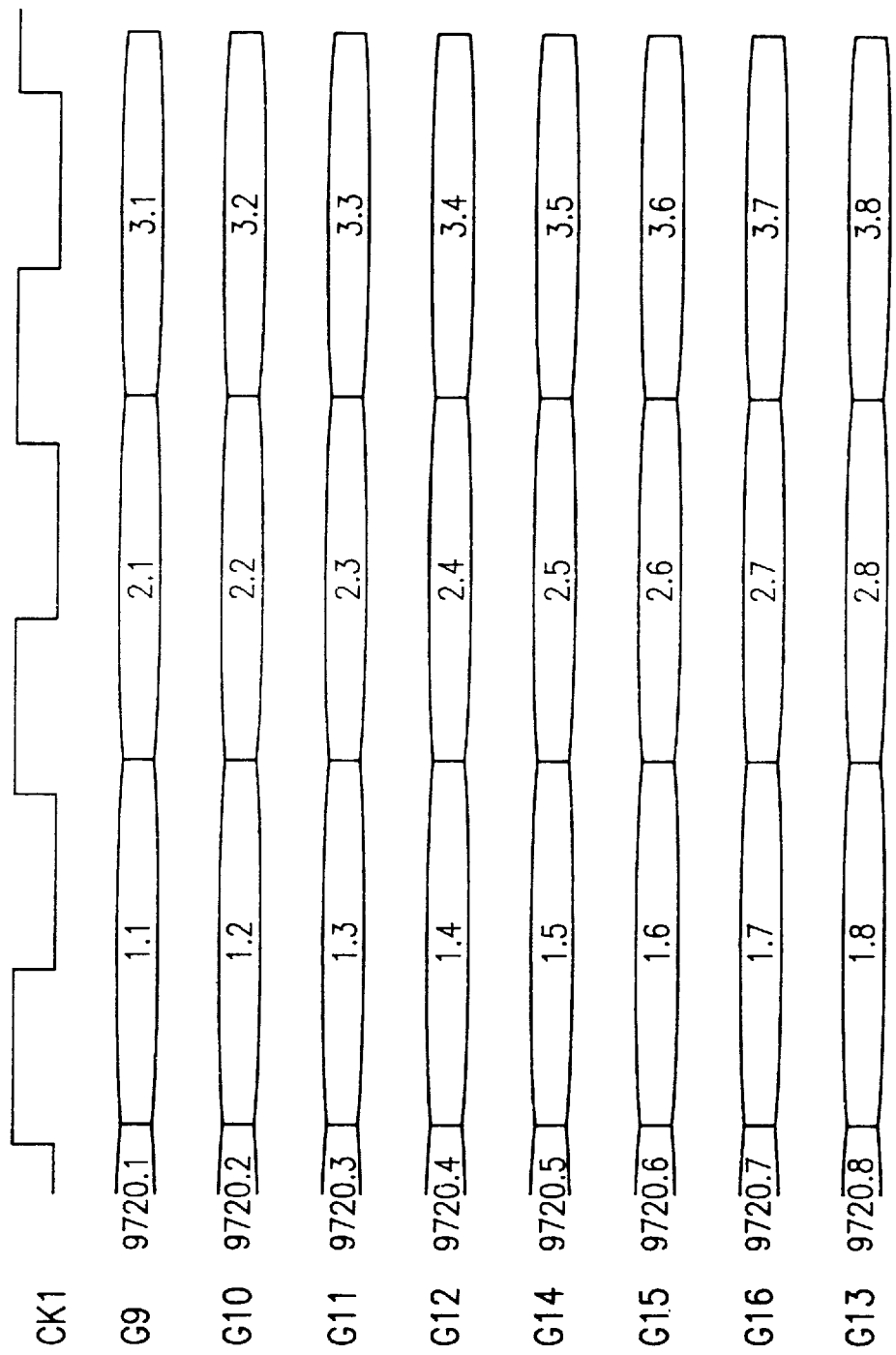
FIG. 8E is a timing diagram of data G9–G16 according to an embodiment of the present invention.

Referring to FIGS. 8B, 8C, and 8D, for the clear understanding of the embodiment, eight of the outputs E1–E16 of the data width extension circuit are enabled according to control signals B1–8 generated from byte alignment control circuit 110, and shifted by one bit for every first clock CK1 according to flipflops 29, 39, 49, 59, 69, 79, 89, and 99 operating in response to the input of the first clock CK1, whereby the outputs are converted into eight-bit parallel data G1–G8.

Referring to FIG. 4, when power is applied, reset signal RSTB of logic 0 is input to reset terminals RSBs of flipflops 12–128, 132, 135, and 136, and a 137th timer, whereby they all store logic 0. Reset signal RSTB becomes logic 1 with the lapse of time. The 137th timer 137 is initialized when 12 continuous A1 frames or A2 frames are generated, or when frame pulse FRP is generated. A 132nd flipflop 132 is initialized when the first clock signal is input 9721 times to the initialized timer 137, the frame loss detection signal OOF is generated, or the 121st–128th flipflops 121–128 are controlled according to the first clock signal by an A1 pattern detection control signal CON which is the output of 132nd flipflop 132. At this time, it is detected whether or not eight of outputs E1–E16 of the data width extension circuit coincide with the A1 pattern, and then byte alignment control signals B1–B8 are output via 121st–128th flipflops 121–128.

Referring to FIG. 5, when power is applied, the reset signal of logic 0 is input to reset terminals RSBs of 143rd counter 143, 149th counter 149, and 145th flipflop 145, whereby they all store logic 0. A reset signal RSTB becomes logic 1 with the lapse of time.

Using 144th multiplexer 144 for detecting whether the A1A1 pattern or A2A2 pattern is detected from output data G1–G16 of flipflops 29, 39, 49, 59, 69, 79, 89, 99, 100, 101, 102, 103, 104, 105, 106, 107 and 108, a selecting signal SELOUT is output, and the input of 144 multiplexer 144 is selected whenever 12 continuous A1 or A2 frame are generated.

If the A1A1 pattern is found continuously seven times at a 143rd counter, an error signal A1ERR is generated and the 143rd counter is initialized. If the A2A2 pattern is found continuously seven times at a 149th counter, an error signal A2 ERR is generated and the 149th counter is initialized.

Referring to FIG. 6, when power is applied, the reset of logic 0 is input to reset terminals RSBs of the 152nd counter 152, 162nd counter 162, and 172nd counter 172, whereby they all store logic 0. The reset signal RSTB becomes logic 1 with the lapse of time. 152nd counter 152 is initialized when an A1 error signal A1ERR, an A2 error signal A2ERR, a frame pulse FRP, or a frame sync signal FRSYNC is generated. An 162nd counter 162 is initialized when a frame pulse FRP or a frame sync signal FRSYNC is generated. An 172nd counter 172 is initialized when an frame sync signal FRSYNC is generated.

Figure 8F:
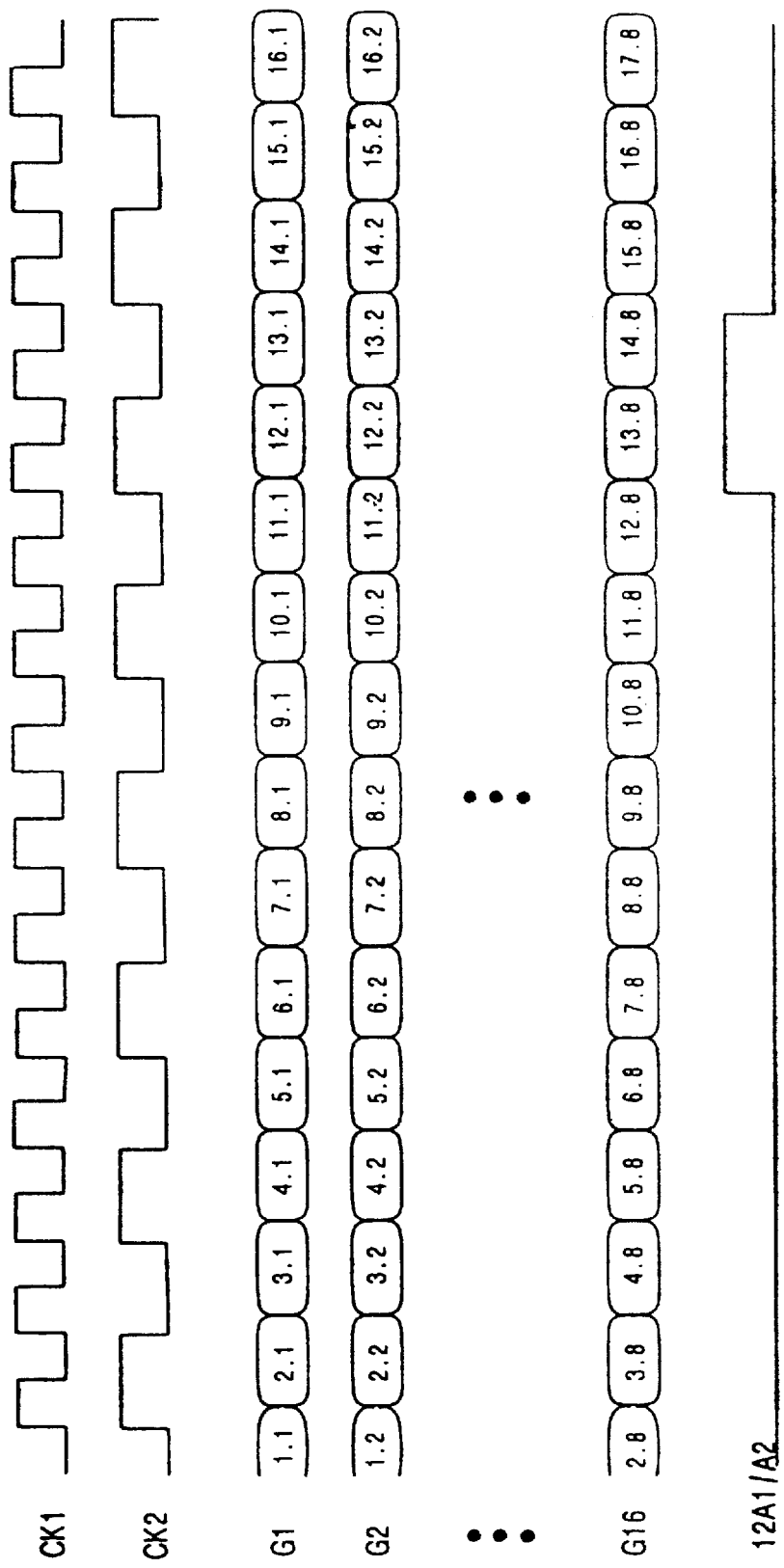
FIG. 8F is a timing diagram of data G1–G8 and signal waveforms repesenting 12A1/A2 according to an embodiment of the present invention.
Figure 8G:
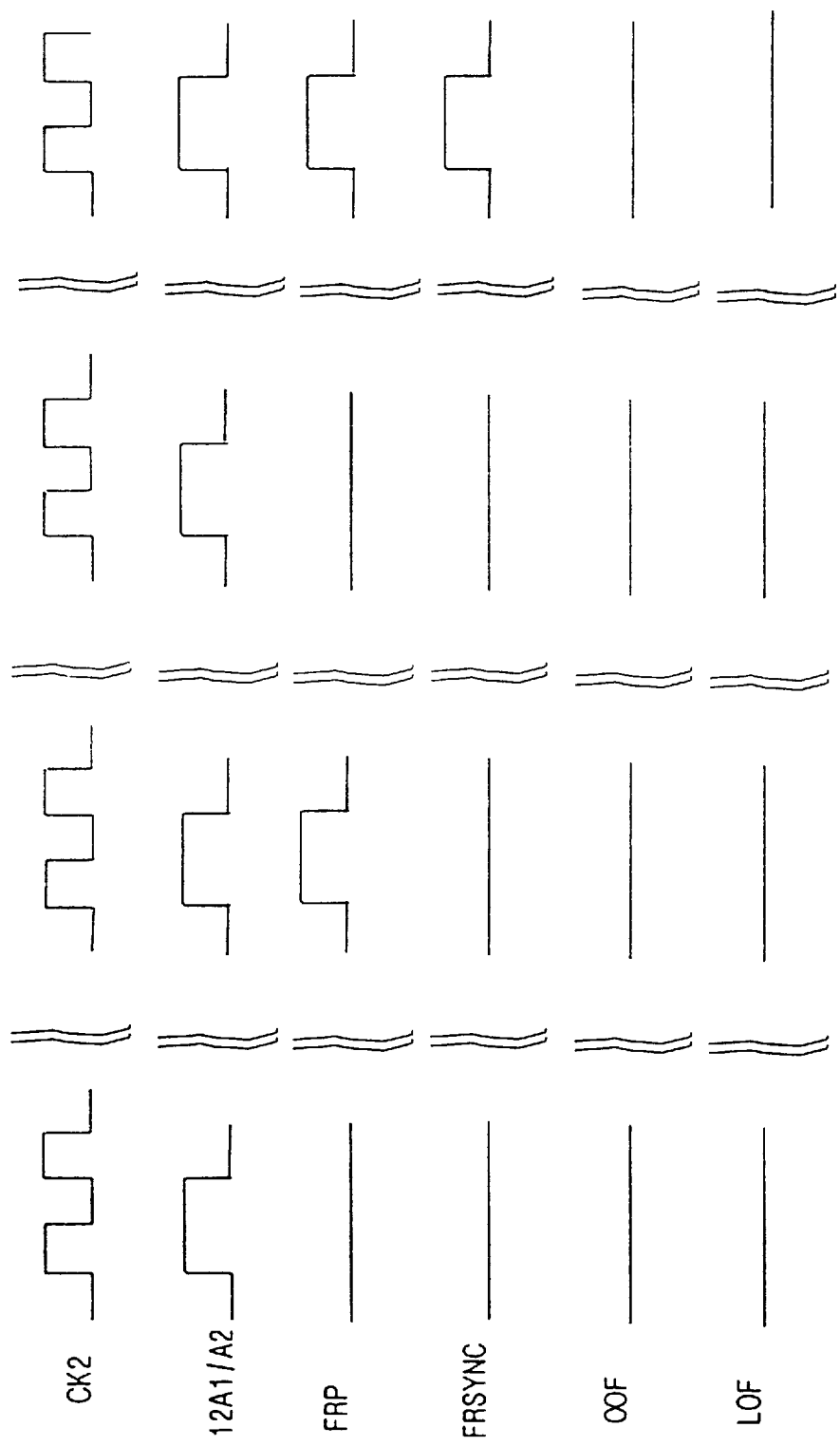
FIG. 8G is a timing diagram of signals 12A1/A2, FRP, FRSYNC, OOF, and LOF according to an embodiment of the present invention.

Referring to FIGS. 8F and 8G for more clear understanding of the present invention, the counter 152 is enabled whenever the output signal SELOUT of 144th multiplexer 144 becomes logic 1. When the output of the 152nd counter 152 becomes 12, a pulse signal is generated and this signal means that continuous pattern detection signal 12A1/A2 is logic 1. The counter 162 is enabled whenever the output signal 12A1/A2 of the 152nd counter 152 becomes logic 1. When the output of 162nd counter 162 become 2, a frame pulse signal FRP is generated. And the counter 172 is enabled whenever the frame pulse signal FRP becomes logic 1. And when the output of the 172nd counter 172 becomes 2, a frame sync signal FRSYNC is generated.

Referring to FIG. 7, When power is applied, a reset signal RSTB of logic 0 is input to reset terminals RSBs of a 184th counter 184, a 195th counter 195, a 186th timer 186, a 197th timer 197, a 181st flipflop 181, a 188th flipflop 188, and 191st flipflop 191, whereby they all store logic 0. The reset signal RSTB becomes logic 1 with the lapse of time.

Figure 8H:
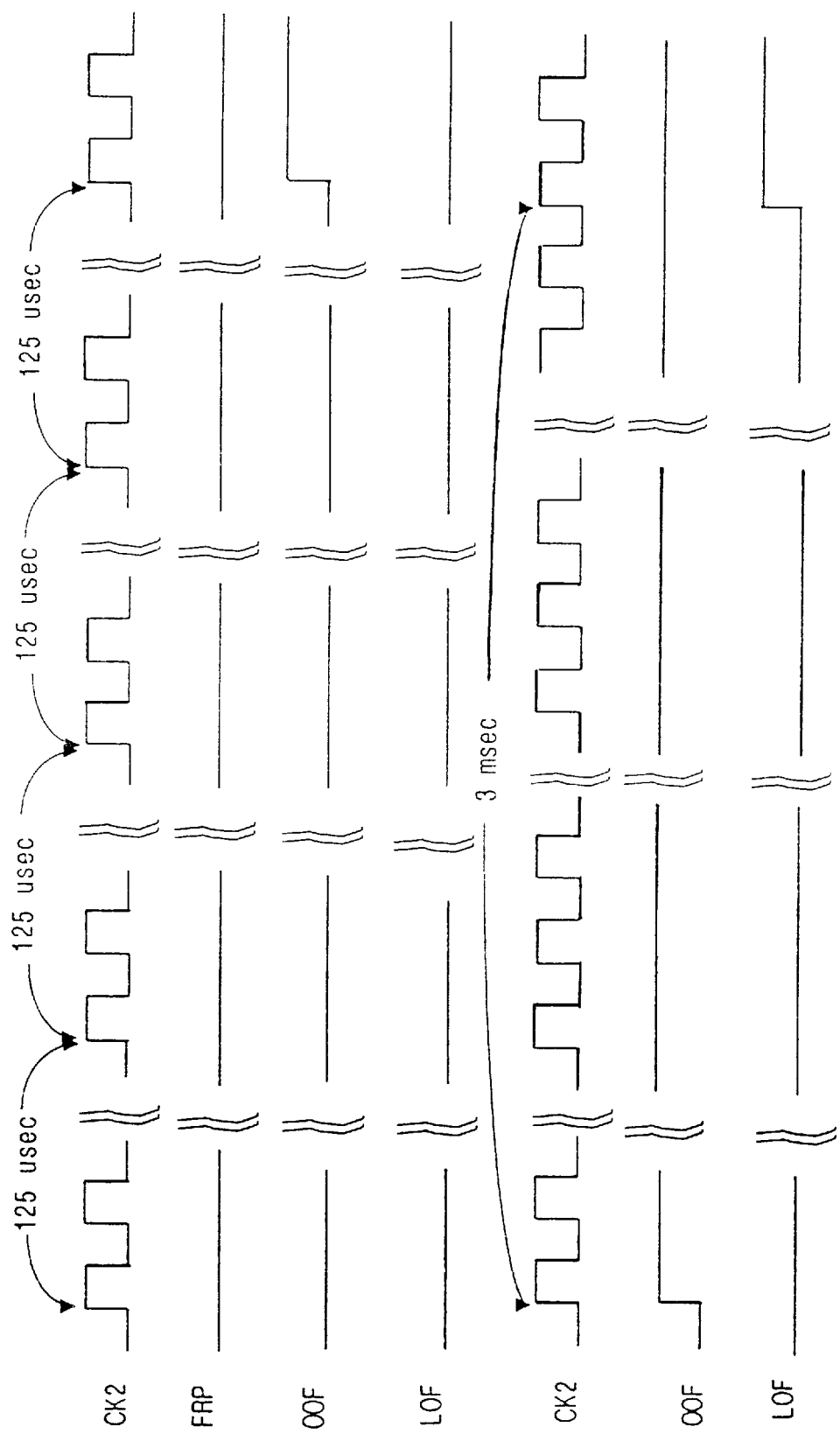
FIG. 8H is a timing diagram of signals FRP, OOF, and LOF according to an embodiment of the present invention.

Referring to FIG. 8H for more clear understanding of the present invention, the 197th timer is used to detect that a frame sync signal FRSYNC is not generated for four frames by the pulse generated at every 125 $\mu$sec, so as to generate a frame sync loss signal OOF. The 186th timer and 184th counter are used to detect whether or not the frame sync loss signal 00F is maintained for 3 msec, so as to generate a frame sync error signal LOF. As described above, the present invention will be advantageous as follows;

First, byte alignment is performed very fast, and the output of the frame synchronization is applied to byte alignment, to thereby certainly prevent an error from aligning the similar pattern.

Secondly, frame sync loss state and frame sync error state are detected to be applied to the aligner and frame synchronizer, to thereby improve the performance of byte alignment ad frame synchronization.

Thirdly, receiving data is processing in parallel, to thereby reduce the power of the frame synchronizer using a low-speed clock.

Fourthly, this byte aligner and frame synchronizer is enable to reduce cost of manufacturing in the semiconductor process, and to get high speed and performance.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A byte aligner and frame synchronizer for 622 Mbit/s high-speed data, comprising:
   clock division means generating the second clock by dividing the first clock;
   data width extension means for extending eight input data into sixteen outputs clocked by said first clock;
   byte alignment control means for generating a control signal for byte alignment from the 16 outputs of said data width extension means;
   byte alignment means for aligning bytes with the data outputted from said data width extension means driven by the byte control signal of said byte alignment control means;
   A1A1 pattern detection means for detecting two continuous A1 frame bytes from data aligned in byte by said byte alignment means;
   A2A2 pattern detection means for detecting two continuous A2 frame bytes from data aligned in byte by said byte alignment means;
   pattern selection means for selecting one of the output signal of said A1A1 pattern detection means and the output signal of said A2A2 pattern detection means;

continuous pattern detection means for detecting whether an A1 frame pattern consisted of twelve continuous A1 frame bytes or an A2 frame pattern consisted of twelve continuous A2 frame bytes is received, in response to one of the signals from said pattern selection means in synchronization with said second clock from said clock division means;

frame pulse generation means for detecting whether said A2 frame pattern is received in sequence to said A1 frame pattern, in response to said second clock, so as to generate a frame pulse; frame sync detection means for detecting whether said frame pulse signal from said frame pulse generation means is received continuously twice, in response to said second clock, so as to generate a frame sync signal;

frame sync loss detection means for detecting whether said frame sync signal outputted from said frame sync detection means is not received continuously four times, in response to said second clock, so as to output a frame sync loss detection signal; and frame sync error detection means for detecting whether said frame sync loss detection signal outputted from said frame sync loss detection means is maintained for 3 msec, in response to said second clock.

2. The byte aligner and frame synchronizer as claimed in claim 1, wherein said data width extension means comprises:

first–eighth flip-flops for receiving 8 input data and outputting eight parallel data(E9–E16) in synchronization with said first clock; and 11th–18th flip-flops for receiving parallel data outputted from said first–eight flip-flops and outputting eight parallel data(E1–E8) in synchronization with said first clock.

3. The byte aligner and frame synchronizer as claimed in claim 1, wherein said byte alignment means comprises:

first–eighth tri-state buffers for buffering and receiving outputs (E1–E8), among the outputs (E1–E16) of said first–8th flip-flops and 11th–18th flip-flops of said data width extension means, according to the byte control signal of said byte alignment control means;

11th–18th tri-state buffers for buffering and receiving outputs E2–E9;

21st–28th tri-state buffers for buffering and receiving outputs E3–E10;

31st–38th tri-state buffers for buffering and receiving outputs E4–E11;

41st–48th tri-state buffers for buffering and receiving outputs E5–E12;

51st–58th tri-state buffers for buffering and receiving outputs E6–E13;

61st–68th tri-state buffers for buffering and receiving outputs E7–E14;

71st–78th tri-state buffers for buffering and receiving outputs E8–E15;

29th–99th flip-flops for shifting, by one bit for every first clock, each output data of said first–eighth tri-state buffers, said 11th–18th tri-state buffers, said 21st–28th tri-state buffers, said 31st–38th tri-state buffers, said 41st–48th tri-state buffers, said 51st–58th tri-state buffers, said 61st–68th tri-state buffers, and said 71st–78th tri-state buffers, so as to output eight-bit parallel data (G9–G16); and 100th–108th flip-flops for receiving said eight-bit parallel data (G9–G16) outputted from said 29th–99th flip-flops and shifting them by one bit for every first clock to output eight-bit parallel data (G1–G8).

4. The byte aligner and frame synchronizer of claim 1, wherein said byte alignment control means comprises:

an 111th AND gate for receiving outputs E1–E8 among outputs E1–E16 of said data width extension means and outputting a first comparison signal (H1) indicative of whether they coincide with A1 (=11110110);

an 121st flip-flop for receiving said first comparison signal (H1) and the fedback byte alignment control signal in synchronization with said first clock and outputting a first byte alignment control signal (B1);

an 112th AND gate for receiving outputs E2–E9 and outputting a second comparison signal (H2) indicative of whether they coincide with A1 (=11110110);

an 122nd flipflop for receiving said second comparison signal (H2) and the fedback byte alignment control signal in synchronization with said first clock and outputting a second byte alignment control signal (B2);

an 113rd AND gate for receiving outputs E3–E10 and outputting a third comparison signal (H3) indicative of whether they coincide with A1 (=11110110);

an 123rd flipflop for receiving said third comparison signal (H3) and the fedback byte alignment control signal in synchronization with said first clock and outputting a third byte alignment control signal (B3);

an 114th AND gate for receiving outputs E4–E11 and outputting a fourth comparison signal (H4) indicative of whether they coincide with A1 (=11110110);

an 124th flipflop for receiving said fourth comparison signal (H4) and the fedback byte alignment control signal in synchronization with said first clock and outputting a fourth byte alignment control signal (B4);

an 115th AND gate for receiving outputs E5–E12 and outputting a fifth comparison signal (H5) indicative of whether they coincide with A1 (=11110110);

an 125th flipflop for receiving said fifth comparison signal (H5) and the fedback byte alignment control signal in synchronization with said first clock and outputting a fifth byte alignment control signal (B5);

an 116th AND gate for receiving outputs E6–E13 and outputting a sixth comparison signal (H6) indicative of whether they coincide with A1 (=11110110);

an 126th flipflop for receiving said sixth comparison signal (H6) and the fedback byte alignment control signal in synchronization with said first clock and outputting a sixth byte alignment control signal (B6);

an 117th AND gate for receiving outputs E7–E14 and outputting a seventh comparison signal (H7) indicative of whether they coincide with A1 (=11110110);

an 127th flipflop for receiving said seventh comparison signal (H7) and the fedback byte alignment control signal in synchronization with said first clock and outputting a seventh byte alignment control signal (B7);

an 118th AND gate for receiving outputs E8–E15 and outputting an eighth comparison signal (H8) indicative of whether they coincide wit A1 (=11110110);

an 128th flip-flop for receiving said eighth comparison signal (H8) and said fedback byte alignment control signal in synchronization with said first clock and outputting an eighth byte alignment control signal (B8); and an 130th flip-flop control signal generator which generates a control signal to maintain said 121st–128th flip-flops to the previous values B1–B8 on the basis of frame sync loss detection signal OOF from the frame sync loss detection circuit, continuous pattern detection signal 12A1/A2 from the continuous pattern detector, frame pulse signal FRP the from frame pulse generator, and frame sync signal FRSYNC from the frame sync detection means.

5. The byte aligner and frame synchronizer of claim 4, wherein a flip-flop control signal generator comprises an 136th flip-flop for outputting frame loss detection signal OOF from the said frame sync loss detection clocked by the first clock CK1;

an 135th flip-flop for outputting the output from said 136th flip-flop clocked by the first clock CK1;

an 134th AND gate for having a first and second inputs respectively coupled to said outputs of 136th flip-flop and said 135th flip-flop;

an 138th NOR gate 138 for having a first, second and third inputs respectively coupled to the reset signal RSTB which is input when power is applied, the frame pulse signal FRP from an 160th fame pulse generator, and continuous pattern detection signal 12A1/A2 from an 150th continuous pattern detector;

a first timer for outputting the output of said 138th NOR gate at the 9721st period of the first clock CK1;

an 133th NOR gate for having a first and a second inputs respectively coupled to the outputs of said 134th AND gate and said first timer;

an 131st OR gate for having a first, a second and a third inputs respectively coupled to a continuous pattern detection signal 12A1/A2, a frame pulse signal FRP, and the frame sync signal FRSYNC; and a 132nd D-flipflop reset by the output of the 133rd NOR gate and outputting an A1 pattern detection control signal CON according to the signal output from said 131st OR gate.

6. The byte aligner and frame synchronizer of claim 1, wherein said A1A1 pattern detection means comprises an 119th AND gate for detecting whether the outputs of said byte alignment means coincide with A1A1 pattern.

7. The byte aligner and frame synchronizer of claim 1, wherein said A2A2 pattern detector comprises an 129th AND gate for detecting whether the outputs of said byte alignment means coincide with A2A2 pattern.

8. The byte aligner and frame synchronizer of claim 1, wherein said pattern selection means comprises:

an 144th multiplexer, an 145th flipflop, and an 146th AND gate for selecting one of the outputs of said A1A1 pattern detection means and A2A2 pattern detection means;

an 143rd counter, an 141st AND gate, and an 142nd NOR gate for detecting whether the A1A1 pattern is continuously generated seven times; and an 149th counter, an 147th AND gate, and an 148th NOR gate for detecting whether the A2A2 pattern is continuously generated seven times.

9. The byte aligner and frame synchronizer of claim 1, wherein said continuous pattern detection means comprises an 152nd counter and a 151st NOR gate for detecting whether the A1A1 pattern or the A2A2 pattern is continuously detected six times.

10. The byte aligner and frame synchronizer of claim 1, wherein said frame pulse generation means comprises an 162nd counter and an 161st AND gate for detecting whether the A1A1 pattern is continuously detected six times and then the A2A2 pattern is continuously detected six times.

11. The byte aligner and frame synchronizer of claim 1, wherein said frame sync detection means comprises an 172nd counter and an 171st AND gate for detecting whether the frame pulse is continuously detected twice.

12. The byte aligner and frame synchronizer of claim 1, wherein said frame sync loss detection means comprises an 184th counter, an 187th NAND gate, an 185th NOR gate, an 183rd AND gate, an 182nd multiplexer, an 181st flipflop, and an 188th flipflop for detecting whether the output signal OOF of said frame sync. loss setection means is maintained for 3 msec.

13. The byte aligner and frame synchronizer of claim 1, wherein said frame sync. loss setection means comprises an 195th counter, a 194th NAND gate, an 189th AND gate, an 193rd OR gate, an 196th OR gate, an 198th NOR gate, an 192nd multiplexer, and an 191st flipflop for detecting whether the output signal FRSYNC of said frame sync detection means is not generated continuously four times.

* * * * *